Figure 1:
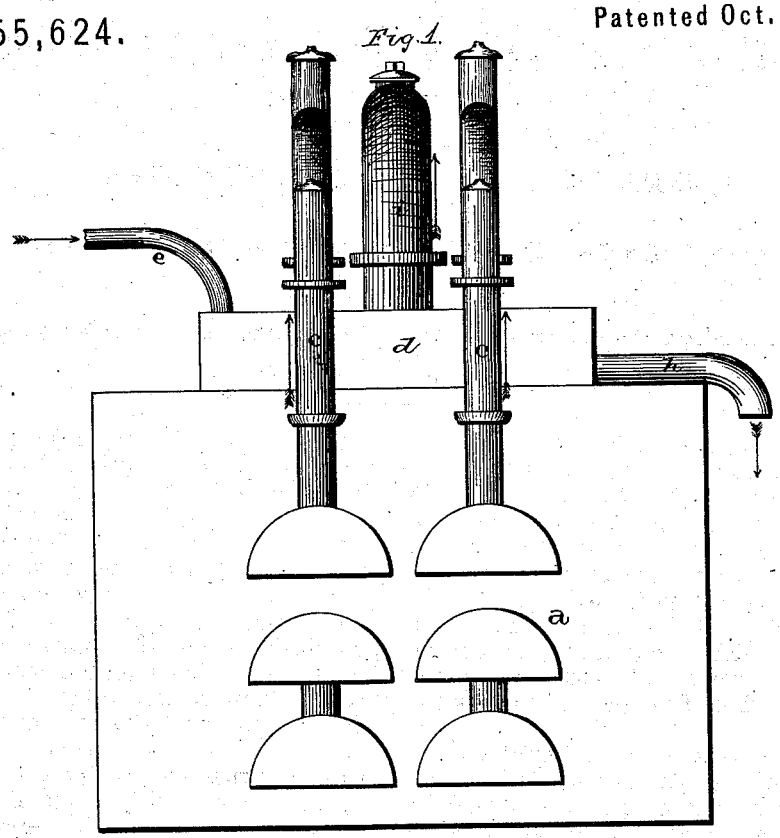
Figure 2:
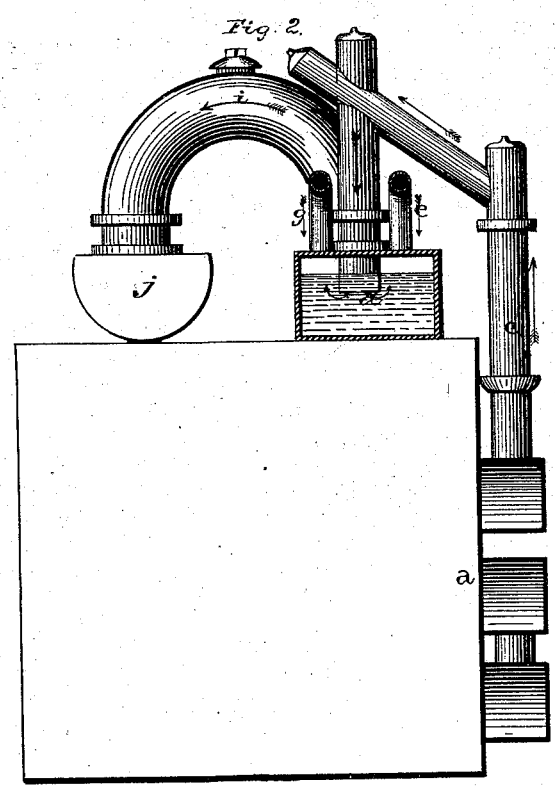

J. SLADE.
Tar Traps for Gas Retorts.

No. 155,624.

Patented Oct. 6, 1874.

WITNESSES.
J. W. M. Garner
Edw. Johnson

INVENTOR.
Jas. Slade
per
F. A. Lehmann
atty.

UNITED STATES PATENT OFFICE.

JAMES SLADE, OF YONKERS, NEW YORK.

IMPROVEMENT IN TAR-TRAPS FOR GAS-RETORTS.

Specification forming part of Letters Patent No. 155,624, dated October 6, 1874; application filed July 22, 1874.

*To all whom it may concern:*

Be it known that I, JAMES SLADE, of Yonkers, in the county of Westchester and State of New York, have invented certain new and useful Improvements in Tar-Traps for Gas-Retorts; and I do hereby declare the following to be a full, clear, and exact description of the invention, such as will enable others skilled in the art to which it pertains to make and use it, reference being had to the accompanying drawings, which form part of this specification.

My invention relates to an improved tar-trap for gas-retorts; and it consists in a suitable box or trap placed upon the top of the benches, and to which are attached both a steam and a water pipe, and a pipe to carry off the water and the tar. This trap is placed between the stand-pipe and the hydraulic main, and, being kept full of water, it prevents the tar from passing into the pipe leading to the main and stopping it up, all of which will be more fully described hereafter.

The accompanying drawings represent my invention.

*a* represents one or more benches of retorts, which are provided with the stand-pipes *c*, which extend upward and have their upper ends passed down into the trap *d*, which is placed upon the top of the benches, or in any other convenient position. This trap consists of a box of any desired shape or size, which has a steam-pipe, *e*, and a water-pipe, *g*, and a discharge-pipe, *h*, the discharge-pipe opening from the bottom of the trap, so as to carry off its whole contents. If so desired, there may be a trap for each bench of retorts. From the top of this trap extends the pipe *i*, through which the gas passes into the hydraulic main *j*.

In making gas in retorts, which are placed one above the other and connected together, so that all the gas passes through the top retort, hard tar is formed in the pipe leading to the hydraulic main, and in the main itself, in such quantities as to soon entirely stop the main up; and as there is no way of removing this tar, the main soon becomes worthless. In order to prevent the obstruction of this main, the trap *d* is filled with water up above the ends of the stand-pipes, so that all the gas will be compelled to pass through the water before passing into the main, and in this passage through the water all the tar is left behind in the trap. As soon as the deposit of the tar in the trap becomes objectionable, steam is turned on into the trap, which melts the tar so that it will run readily out through the discharge-pipe into the receptacle placed to receive it.

When there is no danger of hard tar the water may be let out of the trap, and the gas thus allowed to pass into the main without a seal, so as to prevent the pressure on the retorts, and the collection of carbon in them. Generally, each bench will be provided with its own trap, so that each bench can be charged, drawn, and unsealed without interfering with the others.

Having thus described my invention, I claim—

The combination of the trap *d*, stand-pipe *c*, having its upper end dipping down below the level of the water in the trap, pipe *i*, and hydraulic main *j*, the trap being provided with steam and water pipes *e g*, and a pipe, *h*, for carrying off both water and tar, substantially as shown and described.

In testimony that I claim the foregoing I have hereunto set my hand and seal this 14th day of July, 1874.

JAMES SLADE. [L. S.]

Witnesses:
 JAS. G. WOODWORTH,
 W. H. DOTY.